(12) United States Patent
Huang et al.

(10) Patent No.: US 9,950,432 B1
(45) Date of Patent: Apr. 24, 2018

(54) VACUUM SUCKER WITH ONE-CAVITY AND MULTI-HOLES

(71) Applicant: Xiamen hannoo industrial product design Co. Ltd., Xiamen (CN)

(72) Inventors: Haisheng Huang, Xiamen (CN); Changhong Wen, Xiamen (CN)

(73) Assignee: Xiamen Niujianni Smart Home Co., Ltd., Xiamen (CN)

( * ) Notice: Subject to any disclaimer, the term of this patent is extended or adjusted under 35 U.S.C. 154(b) by 0 days.

(21) Appl. No.: 15/405,293

(22) Filed: Jan. 12, 2017

(51) Int. Cl.
*B25J 15/06* (2006.01)

(52) U.S. Cl.
CPC ....... *B25J 15/0616* (2013.01); *B25J 15/0641* (2013.01); *B25J 15/0683* (2013.01)

(58) Field of Classification Search
CPC ............ B25J 15/0616; B25J 15/0625; B25J 15/0633; B25J 15/0641; B25J 15/0683; B66C 1/0212; B66C 1/0225; B66C 1/0231; B66C 1/0237; B66C 1/025
USPC .............. 294/183, 187, 188, 189; 248/205.9
See application file for complete search history.

(56) References Cited

U.S. PATENT DOCUMENTS

| | | | | |
|---|---|---|---|---|
| 2,523,157 A * | 9/1950 | Somma | ................ | G11B 17/16 294/189 |
| 3,602,543 A * | 8/1971 | Sjodin | ................ | B66C 1/0212 248/363 |
| 3,643,992 A * | 2/1972 | Jacobucci | ............... | B66C 1/025 294/188 |
| 4,674,785 A * | 6/1987 | Riesenberg | ........... | B25B 11/005 294/186 |
| 5,344,202 A * | 9/1994 | Ramler | ................ | B25J 15/0616 294/188 |
| 6,328,363 B1 * | 12/2001 | Larsen | ................. | B25B 11/007 294/187 |
| 2006/0125257 A1 * | 6/2006 | Liang | ................. | H05K 13/0408 294/189 |
| 2015/0240862 A1 * | 8/2015 | Shi | ......................... | F16B 47/00 248/205.8 |
| 2015/0377280 A1 * | 12/2015 | Potters | .................... | A47G 1/17 248/205.9 |
| 2016/0107320 A1 * | 4/2016 | Ji | ......................... | B25B 11/005 294/189 |

* cited by examiner

*Primary Examiner* — Dean J Kramer
(74) *Attorney, Agent, or Firm* — Gokalp Bayramoglu

(57) ABSTRACT

The present application discloses a vacuum sucker with one-cavity and multi-holes, which comprises a housing, a sucker member, a suction chamber and a piston member. The housing is connected to the sucker member. The sucker member is provided with at least two recess type chambers on bottom surface. The suction chamber is provided with air holes which are communicated with the recess type chambers. The piston member is movably mounted in the suction chamber and is provided with a component for one-way communication by sucking the air from the suction chamber to the outside through a reciprocating motion of the piston member. Each of the recess type chambers is provided with an air hole communicated with the suction chamber. The present application provides a vacuum sucker with one-cavity and multi-holes, achieving a better use effect through a plurality of the recess type chambers being sucked on the sucking surface.

9 Claims, 5 Drawing Sheets

VACUUM SUCKER WITH ONE-CAVITY AND MULTI-HOLES

TECHNICAL FIELD

The present application relates to a vacuum sucker, particularly relating to a vacuum sucker with one-cavity and multi-holes.

BACKGROUND

A vacuum sucker can be attached on a wall, glass surface, and porcelain glazed surface by forming a vacuum cavity between its sucker and the target surface and thus is widely used in various fields. The vacuum suckers available on the market are mainly divided into two types, i.e. a suction type and an exhaust type. Both deformation and hardening of the sucker material and an uneven sucking surface can result in a poor seal of the vacuum chamber. Over time, the vacuum sucker will be subject to vacuum leakage and gradually lose its capacity of suction such that the normal use of the product will be affected.

SUMMARY

The object of the present application is to overcome the deficiency of the prior art by providing a vacuum sucker with one-cavity and multi-holes, which achieves a better effect in use through a plurality of the recess type chambers being sucked on a sucking surface at the same time.

The technical solution used by the present application to solve its technical problem is given as below.

A vacuum sucker with one-cavity and multi-holes comprises a sucker member, a housing, a suction chamber and a piston member. The housing is connected to the sucker member. The sucker member is provided with at least two recess type chambers on its bottom surface. The suction chamber is provided with air holes which are communicated with the recess type chambers. The suction chamber is provided with a component for one-way communication from the recess type chambers to the suction chamber through the air holes. The piston member is movably mounted in the suction chamber and is provided with a component for one-way communication by sucking the air from the suction chamber to the outside through a reciprocating motion of the piston member. Each of the recess type chambers is provided with an air hole for communication with the suction chamber. Each air hole is provided with a component for one-way communication of the air from a respective recess type chamber to the suction chamber through the air hole.

Preferably, the housing is connected to the sucker member by a screw member.

Preferably, the vacuum sucker comprises a one-way valve member, which is pressed by an elastic member to cover all openings of the air holes on the suction chamber's side. The one-way valve member and the elastic member form the component for one-way communication from all recess type chambers to the suction chamber through the air holes.

Preferably, the piston member includes a piston support and a piston mounted to the piston support, and the piston abuts against an internal wall of the suction chamber and forms the component for one-way communication from the suction chamber to outside.

Preferably, the piston member is mounted to the suction chamber through an elastic member.

Preferably, the piston member and the one-way valve member share an elastic member.

Preferably, the elastic member is a spring member.

Preferably, the sucker member further includes a plurality of highly elastic, soft rubber gaskets, which are mounted on the bottom surface of the sucker member and form the at least two recess type chambers.

Preferably, at least two recess type chambers include one round recess type chamber arranged centrally and six fan-shaped recess type chambers arranged symmetrically.

As an optional technical solution, at least two recess type chambers include seven round recess type chambers, wherein each three adjacent recess type chambers are arranged in a form of an equilateral triangle.

As an optional technical solution, at least two recess type chambers include one round recess type chamber located in a center of the sucker member and two annular recess type chambers surrounding the round recess type chamber.

The present application has the following technical effects. On the basis of the common suction-typed vacuum sucker, at least two recess type chambers are provided on the bottom of the sucker member, and the chambers are communicated with the suction chamber through the air holes so as to achieve the purpose that different recess type chambers are vacuumized at the same time by using one suction chamber. Since several recess type chambers reach the vacuum status and attach the target surface at the same time, a better sucking effect can be obtained. Furthermore, even if vacuum leakage occurs in one of the recess type chambers, the sucker still can attach to the target surface with other recess type chambers, making the usage of the vacuum sucker more convenient.

The present application will be illustrated hereafter in detail with reference to the drawings. However, the vacuum sucker with one-cavity and multi-holes of the present application should not be limited to the following embodiments.

DETAILED DESCRIPTION

First Embodiment

Figure 1:
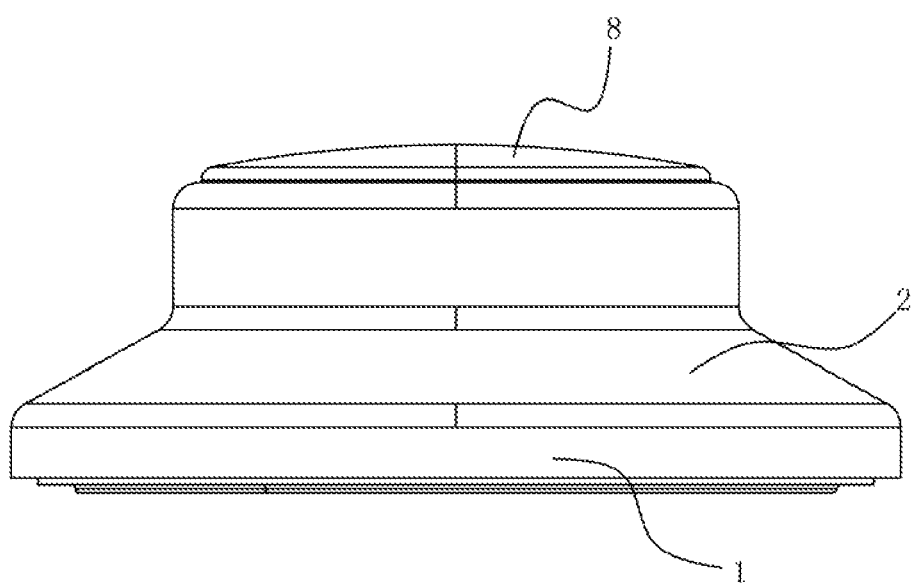
FIG. 1 is a structural diagram of the first embodiment of the present application (front view).
Figure 2:
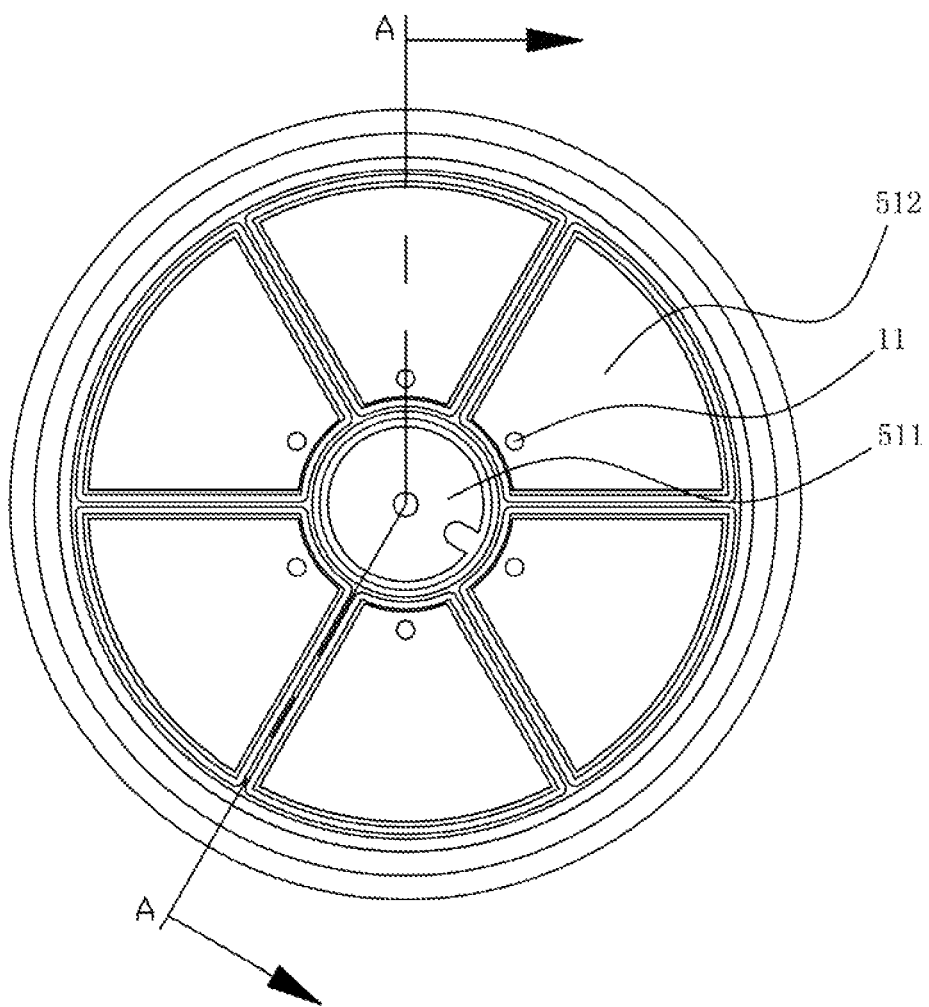
FIG. 2 is another structural diagram of the first embodiment of the present application (bottom view).
Figure 3:
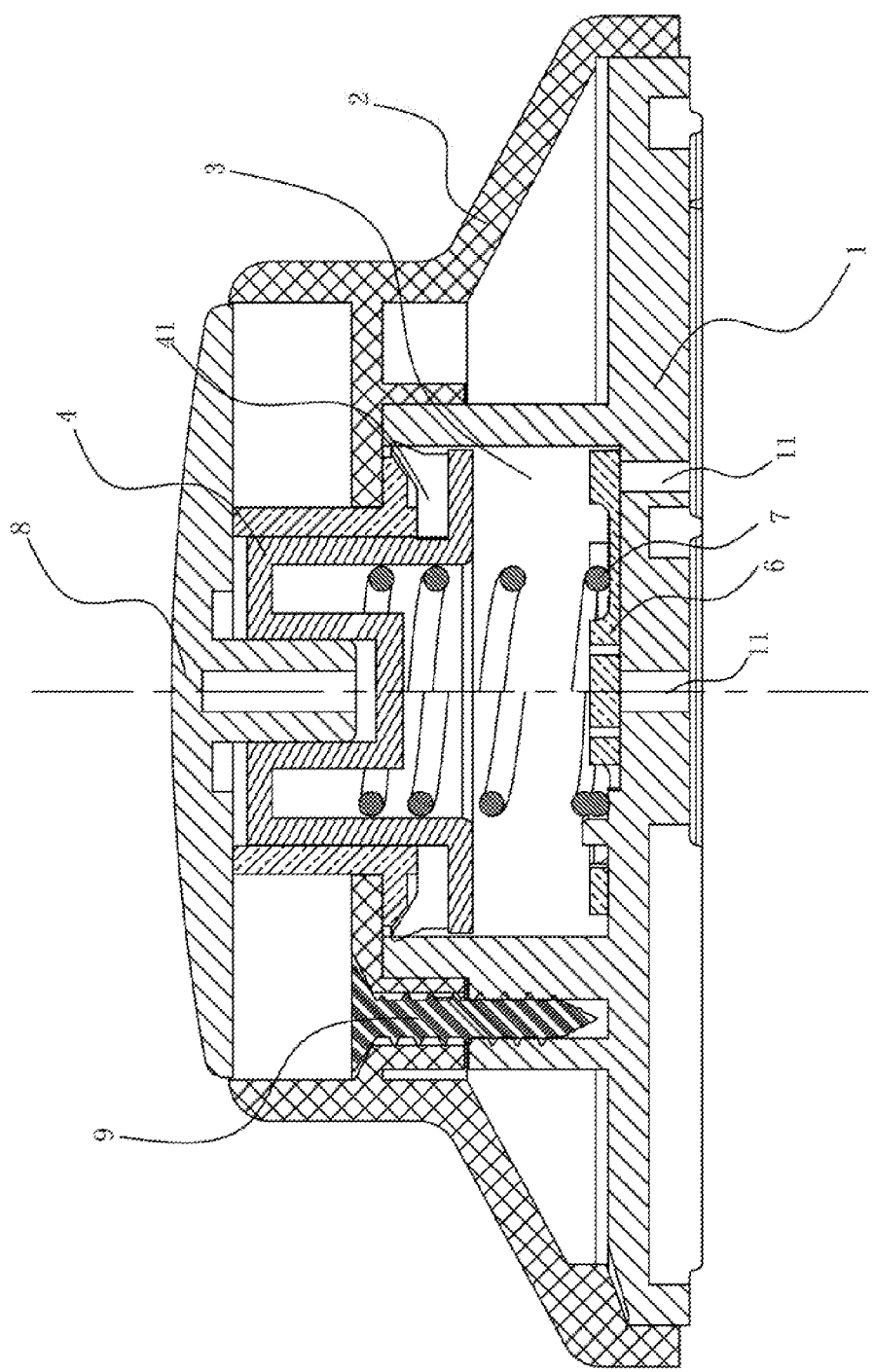
FIG. 3 is yet another structural diagram of the first embodiment of the present application (rotational cross-section view).

As shown in FIG. 1 to FIG. 3, the vacuum sucker with one-cavity and multi-holes of the present application comprises sucker member 1, housing 2, suction chamber 3 and piston member 4. Housing 2 is connected to sucker member 1. Sucker member 1 is provided with at least two recess type chambers on its bottom surface. Suction chamber 3 is provided with air holes 11 which are communicated with the recess type chambers. Suction chamber 3 is provided with a component for one-way communication from the recess type chambers to suction chamber 3 through air holes 11. Piston member 4 is movably mounted in suction chamber 3 and is provided with a component for one-way communication by sucking the air from suction chamber 3 to the outside through a reciprocating motion of piston member 4. Each of the recess type chambers is provided with air hole 11 communicated with suction chamber 3. Each air hole 11 is provided with a component for one-way communication of the air from respective recess type chamber to suction chamber 3 through air hole 11.

Furthermore, housing 2 is connected to sucker member 1 by a screw member.

Furthermore, the vacuum sucker comprises one-way valve member 6, which is pressed by an elastic member to cover all openings of air holes 11 on the side that is close to suction chamber 3. One-way valve member 6 and the elastic member form the component for one-way communication from all recess type chambers to suction chamber 3 through air holes 11. The air in the recess type chambers can upwardly push open one-way valve member 6 to enter suction chamber 3. However, the air in suction chamber 3 cannot downwardly push open one-way valve member 6 to enter the recess type chambers. Thus, the one-way communication is achieved.

Furthermore, piston member 4 includes a piston support and piston 41. Piston 41 is mounted on the piston support. Piston 41 abuts against an internal wall of suction chamber 3 and forms the component for one-way communication of the air from suction chamber 3 to the outside. Piston 41 is made of rubber or other elastic material. Piston 41 abuts against the internal wall of suction chamber 3 at a place in suction chamber 3 that is close to the outside such that the air in suction chamber 3 can outwardly push open piston 41 to flow outside. However, the outside air is unable to push open piston 41 and flow into suction chamber 3. The vacuum sucker further comprises button member 8, which is connected to piston member 4 and can be used by the operator to press piston member 4.

Furthermore, piston member 4 is mounted to suction chamber 3 through an elastic member.

Furthermore, piston member 4 and one-way valve member 6 share an elastic member, which is spring member 7.

Furthermore, sucker member 1 further includes a plurality of highly elastic, soft rubber gaskets, which are mounted on the bottom of sucker member 1 respectively to form the recess type chambers.

Furthermore, the recess type chambers include one round recess type chamber 511 arranged centrally and six fan-shaped recess type chambers 512 arranged symmetrically. Each of round recess type chamber 511 and six fan-shaped recess type chamber 512 is provided with air hole 11 communicated with suction chamber 3.

Second Embodiment

Figure 4:
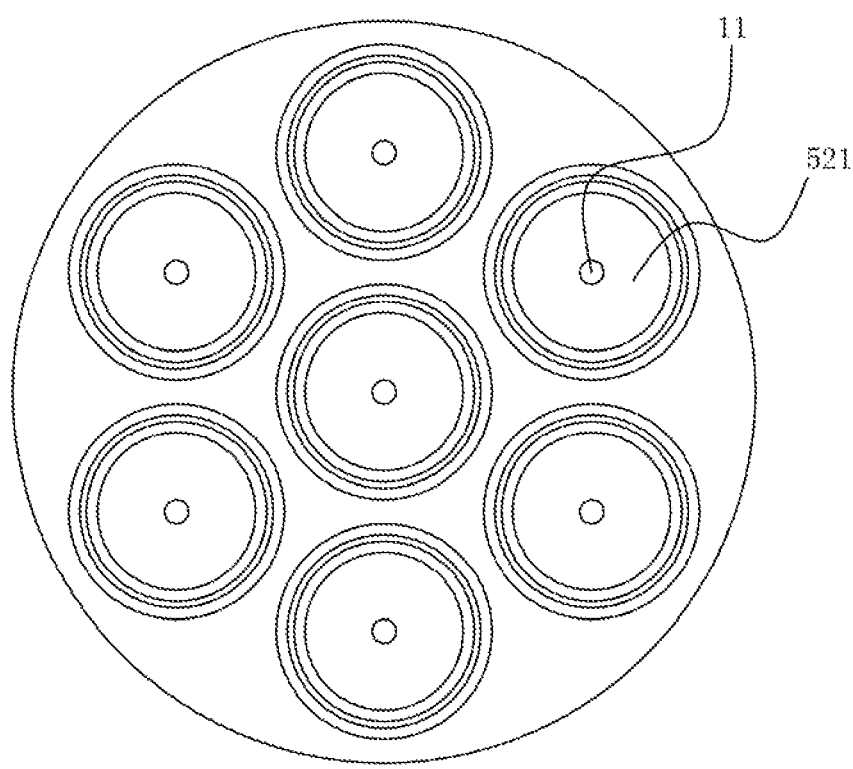
FIG. 4 is a structural diagram of the second embodiment of the present application (bottom view).

As shown in FIG. 4, the difference between the second embodiment and the first embodiment is that the recess type chambers include seven round recess type chambers 521, wherein each three adjacent recess type chambers 521 are arranged in a form of an equilateral triangle. Each of these seven round recess type chambers 521 is provided with air hole 11 communicated with suction chamber 3.

Third Embodiment

Figure 5:
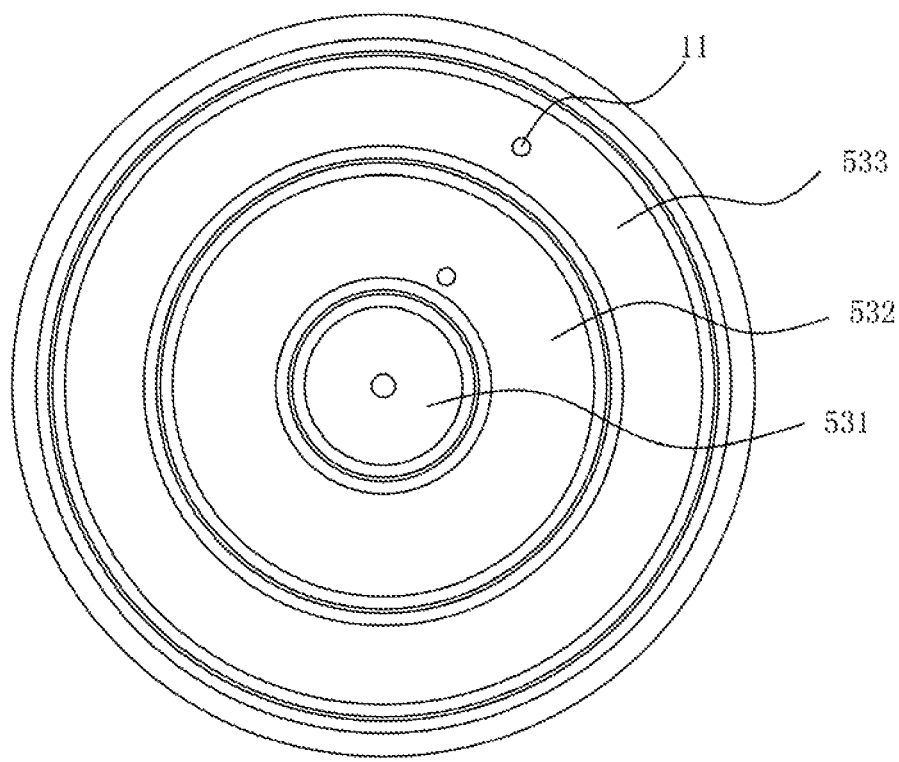
FIG. 5 is a structural diagram of the third embodiment of the present application (bottom view).

As shown in FIG. 5, the difference between the third embodiment and the first embodiment is that the recess type chambers include one round recess type chamber 531 located in the center of sucker member 1 and two annular recess type chambers 532, 533 surrounding round recess type chamber 531. Each round recess type chamber 531 and annular recess type chambers 532, 533 is provided with air hole 11 communicated with suction chamber 3.

The embodiments stated above are merely used for further illustration of the vacuum sucker with one-cavity and multi-holes of the present application. However, the present application should not be limited to these embodiments. All variations, equivalents and modifications of these embodiments based on the technical essences of the present application should be considered as falling within the scope of protection of technical solution of the present application.

What we claim is:

1. A vacuum sucker with one-cavity and multi-holes, comprising a housing, a sucker member, a suction chamber, and a piston member,
   wherein the sucker member is connected to the housing and is provided with at least two recess type chambers on a bottom surface of the sucker member, the suction chamber is provided with air holes which are communicated with at least two recess type chambers, the suction chamber is provided with a component for one-way communication from the at least two recess type chambers to the suction chamber through the air hole, the piston member is movably mounted in the suction chamber and is provided with a component for one-way communication from the suction chamber to outside by sucking air through a reciprocating motion of the piston member,
   wherein each of the at least two recess type chambers is provided with an air hole communicated with the suction chamber, and each air hole is provided with the component for one-way communication from a respective recess type chamber to the suction chamber through the air hole;
   wherein the piston member includes a piston support and a piston mounted to the piston support, and the piston abuts against an internal wall of the suction chamber and forms the component for one-way communication from the suction chamber to outside.

2. The vacuum sucker with one-cavity and multi-holes according to claim 1, further comprising a one-way valve member, which is pressed by an elastic member to cover openings of the air holes on the suction chamber's side, wherein the one-way valve member and the elastic member form the component for one-way communication from the at least two recess type chamber to the suction chamber through the air holes.

3. The vacuum sucker with one-cavity and multi-holes according to claim 1, wherein the piston member is mounted to the suction chamber through an elastic member.

4. The vacuum sucker with one-cavity and multi-holes according to claim 1, wherein the piston member and a one-way valve member share an elastic member.

5. The vacuum sucker with one-cavity and multi-holes according to claim 4, wherein the elastic member is a spring member.

6. The vacuum sucker with one-cavity and multi-holes according to claim 1, wherein the sucker member further includes a plurality of highly elastic, soft rubber gaskets, which are mounted on the bottom surface of the sucker member and form the at least two recess type chambers.

7. The vacuum sucker with one-cavity and multi-holes according to claim 1, wherein the at least two recess type chambers include one round recess type chamber arranged centrally and six fan-shaped recess type chambers arranged symmetrically.

8. The vacuum sucker with one-cavity and multi-holes according to claim 1, wherein the at least two recess type chambers include seven round recess type chambers, wherein each three adjacent recess type chambers are arranged in a form of an equilateral triangle.

9. The vacuum sucker with one-cavity and multi-holes according to claim 1, wherein the at least two recess type chambers include one round recess type chamber located in a center of the sucker member and two annular recess type chambers surrounding the round recess type chamber.

\* \* \* \* \*